United States Patent
Ramakrishnan et al.

(10) Patent No.: US 9,462,339 B2
(45) Date of Patent: Oct. 4, 2016

(54) SYSTEMS AND METHODS FOR DISTRIBUTING VIDEO ON DEMAND

(71) Applicant: AT&T Intellectual Property II, LP, Atlanta, GA (US)

(72) Inventors: Kadangode Ramakrishnan, Berkeley Hgts, NJ (US); Rittwik Jana, Parsippany, NJ (US); Divesh Srivastava, Summit, NJ (US); Vijay Gopalakrishnan, Edison, NJ (US); Samrat Bhattacharjee, Silver Spring, MD (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 85 days.

(21) Appl. No.: 14/270,080

(22) Filed: May 5, 2014

(65) Prior Publication Data
US 2014/0245364 A1    Aug. 28, 2014

Related U.S. Application Data

(62) Division of application No. 12/201,844, filed on Aug. 29, 2008, now Pat. No. 8,752,100.

(51) Int. Cl.
| | |
|---|---|
| *H04N 7/173* | (2011.01) |
| *H04N 21/458* | (2011.01) |
| *H04N 21/433* | (2011.01) |
| *H04N 21/472* | (2011.01) |
| *H04N 21/4788* | (2011.01) |
| *H04N 21/6405* | (2011.01) |
| *H04N 21/6408* | (2011.01) |
| *H04N 21/262* | (2011.01) |

(52) U.S. Cl.
CPC ........ *H04N 21/458* (2013.01); *H04N 7/17318* (2013.01); *H04N 21/262* (2013.01); *H04N 21/4331* (2013.01); *H04N 21/4788* (2013.01); *H04N 21/47202* (2013.01); *H04N 21/6405* (2013.01); *H04N 21/6408* (2013.01)

(58) Field of Classification Search
CPC ........... H04N 21/458; H04N 21/4331; H04N 21/47202; H04N 21/4788; H04N 21/6405; H04N 21/6408; H04N 21/262
See application file for complete search history.

(56) References Cited

U.S. PATENT DOCUMENTS

| | | | |
|---|---|---|---|
| 7,716,710 B1 * | 5/2010 | Everson et al. | 725/110 |
| 2002/0143951 A1 | 10/2002 | Khan et al. | |
| 2002/0194480 A1 | 12/2002 | Nagao | |
| 2003/0236904 A1 | 12/2003 | Walpole et al. | |
| 2005/0259595 A1 | 11/2005 | Preguica | |
| 2006/0039388 A1 | 2/2006 | Shur et al. | |

(Continued)

OTHER PUBLICATIONS

"MPEG-4", Wikipedia, http://en.wikipedia.org/wiki/MPEG-4, May 1, 2008.

(Continued)

*Primary Examiner* — Joshua Taylor
(74) *Attorney, Agent, or Firm* — Guntin & Gust, PLC; Jay H. Anderson

(57) ABSTRACT

A method of receiving content includes joining an in-progress multicast stream to receive a first portion of a content. The method further includes sending a request to a peer for a catch-up portion of the content, the request including a deadline for delivery of the content, and receiving the catch-up portion of the content from the peer prior to the deadline.

13 Claims, 15 Drawing Sheets

(56) References Cited

U.S. PATENT DOCUMENTS

| | | |
|---|---|---|
| 2006/0159090 A1 | 7/2006 | Chang et al. |
| 2006/0190615 A1 | 8/2006 | Panwar |
| 2006/0212584 A1 | 9/2006 | Yu et al. |
| 2007/0002858 A1 | 1/2007 | Bichot et al. |
| 2007/0025276 A1 | 2/2007 | Zwiebel et al. |
| 2007/0025277 A1 | 2/2007 | Sajassi et al. |
| 2007/0073706 A1 | 3/2007 | Ebie et al. |
| 2007/0147411 A1 | 6/2007 | Bijwaard et al. |
| 2007/0177594 A1 | 8/2007 | Kompella |
| 2007/0183342 A1* | 8/2007 | Wong et al. .................. 370/252 |
| 2007/0183418 A1 | 8/2007 | Riddoch et al. |
| 2007/0266169 A1* | 11/2007 | Chen et al. .................. 709/231 |
| 2008/0016201 A1 | 1/2008 | Thompson |
| 2008/0016350 A1 | 1/2008 | Braskich et al. |
| 2008/0101360 A1 | 5/2008 | Napierala |
| 2009/0037968 A1* | 2/2009 | Liu et al. ..................... 725/114 |
| 2009/0168679 A1* | 7/2009 | Benjamim et al. ........... 370/312 |
| 2009/0265473 A1 | 10/2009 | Hydrie et al. |
| 2009/0300642 A1* | 12/2009 | Thaler et al. ................. 718/105 |
| 2010/0228814 A1* | 9/2010 | McKenna et al. ............ 709/203 |
| 2010/0281509 A1 | 11/2010 | Yu |

OTHER PUBLICATIONS

"MPEG-4 BIFS White Paper", http://www.chiariglione.org/mpeg/technologies/mp04-bifs/index.htm, ISO/IEC/JTC/1/SC/29/WG/11 N7608, Oct. 2005.

Bhattacharjee, et al., "CPM—Adaptive Video-on-Demand with Peer Assist and Multicast", AT&T Labs Research, NJ, Dec. 2007.

Gopalkrishnan, et al., "CPM—Specifications", May 22, 2008.

Guo, et al., "P2Cast: Peer-to-Peer Patching Scheme for VoD Service", Dept. of Computer Science, University of Massachusetts at Amherst, MA, www.cs.umass.edu, 2003.

* cited by examiner ary of U.S. patent application Ser. No. 12/201,844, filed on Aug. 29, 2008, which is incorporated herein by reference in its entirety.

FIELD OF THE DISCLOSURE

The present disclosure generally relates to communications networks, and more particularly relates to system and methods for distributing video on demand.

BACKGROUND OF THE DISCLOSURE

Multicasting of video streams has been proposed in order to eliminate duplicate streams flowing through common links in a network. In a typical implementation, multiple multicast streams are started for each video—either streams for the entire video started some time apart, or one stream for a segment of the video—and are cycled over time. Multicasting streams this way scales with the number of individual streams started and is independent of the number of individual users. Multicasting, while effective for streaming live content, comes with complications in the video on demand (VOD) arena. Users may request content at times other than when a multicast stream starts, or may attempt to rewind or fast-forward the video. Thus, multicasting has to be augmented with other approaches before it can be applied to VOD. One popular approach is to unicast streams from the server until the point when the user can be transitioned over to a multicast stream.

Content distribution networks (CDNs) have also been proposed for facilitating distribution of VOD content. Because CDNs are normally located at the edge of the network close to the user, starting unicast streams from these CDNs distributes the load among the servers and bypasses potential points of congestion in the core of the network. The CDN can cache content the first time it is requested and can then use this cached data to serve future requests. Further, CDNs can be arranged as hierarchies such that they do not have to store all possible content; instead, they can cooperatively cache the content and use other mechanisms to locate and share necessary content.

Techniques that leverage the existence of data on the end hosts (peers) have also been suggested for VOD. End hosts participate actively in the system by storing video and by streaming video to other users, thereby alleviating load on the servers. Using these peers for streaming allows for many different combinations of approaches to be applied to address the scalability issues of Internet-based VOD. P2Cast constructs application level multicast trees rooted at the central video servers and comprised of the clients. In an application level multicast tree, the end hosts are organize into a tree so that the VOD server may unicast the VOD content to a parent end host which provides a unicast of the VOD content to a child end host. Video is streamed over the multicast tree to the clients, and clients that arrive late also join the multicast tree. However, the initial part of the stream that was missed may need to be patched, and this can be done by contacting the server or by using the other clients that have cached the initial part of the video. The use of application layer multicast naturally degenerates into a unicast when there is only one viewer watching a particular video (as can be expected with unpopular videos) and no special handling for unpopular videos is necessary.

Alternately, a swarming-based approach is possible where the system relies entirely on peers for the video and utilizes the central server as a directory that maps the data to the peer storing the data. Such an approach has been proposed that arranges the peers in a mesh topology and utilizes a central server that acts as a directory.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

This application is related to U.S. patent application Ser. No. 11/848,031 filed Aug. 30, 2007, entitled "SYSTEMS AND METHODS FOR DISTRIBUTING VIDEO ON DEMAND," the disclosure of which is hereby incorporated herein by reference in its entirety for all purposes.

Figure 1:
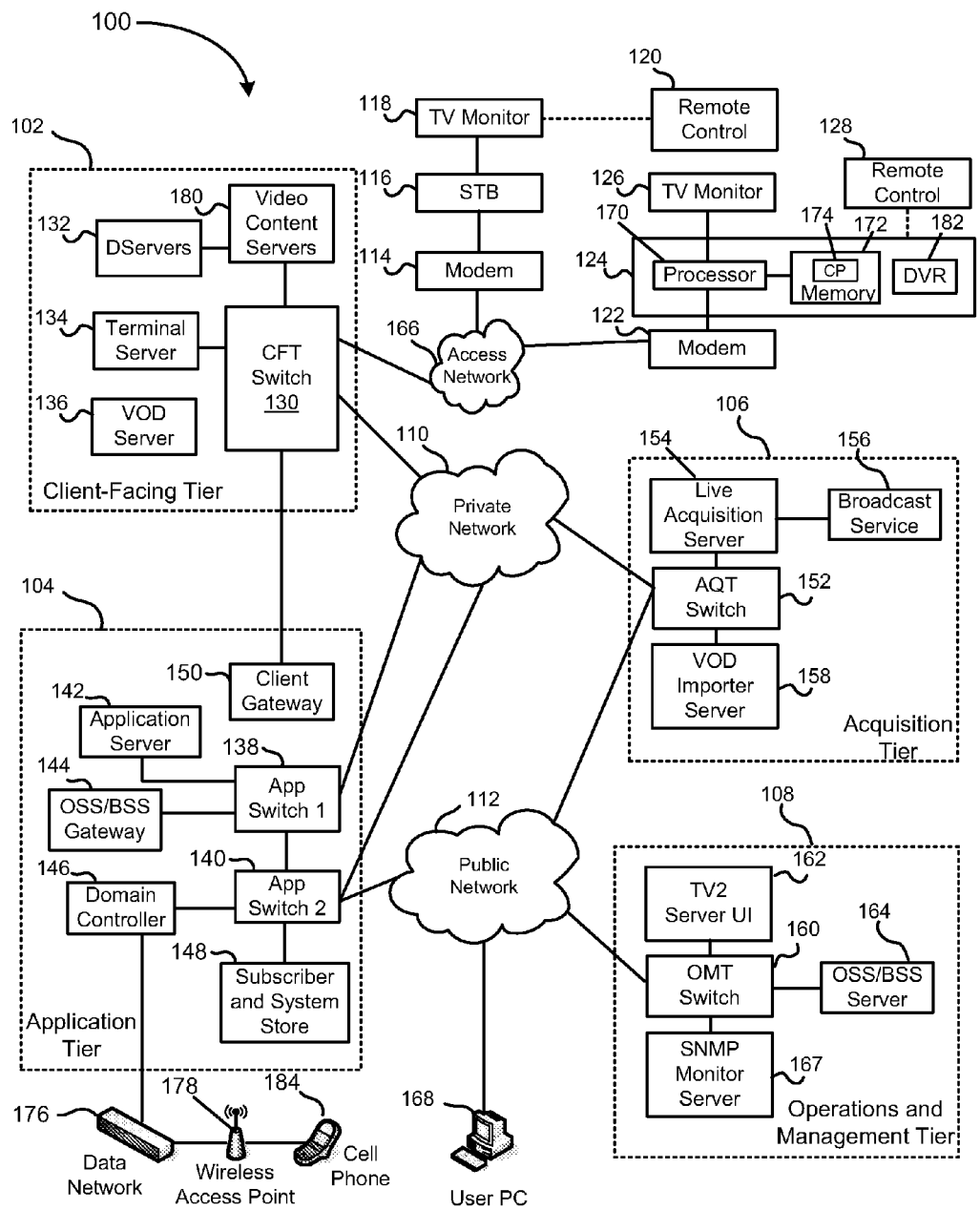
FIG. 1 is a block diagram illustrating an embodiment of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box (STB) device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a VOD importer server 158 that stores television content received at the acquisition tier 106 and communicate the stored content to the client-facing tier 102, such as to VOD server 136, via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
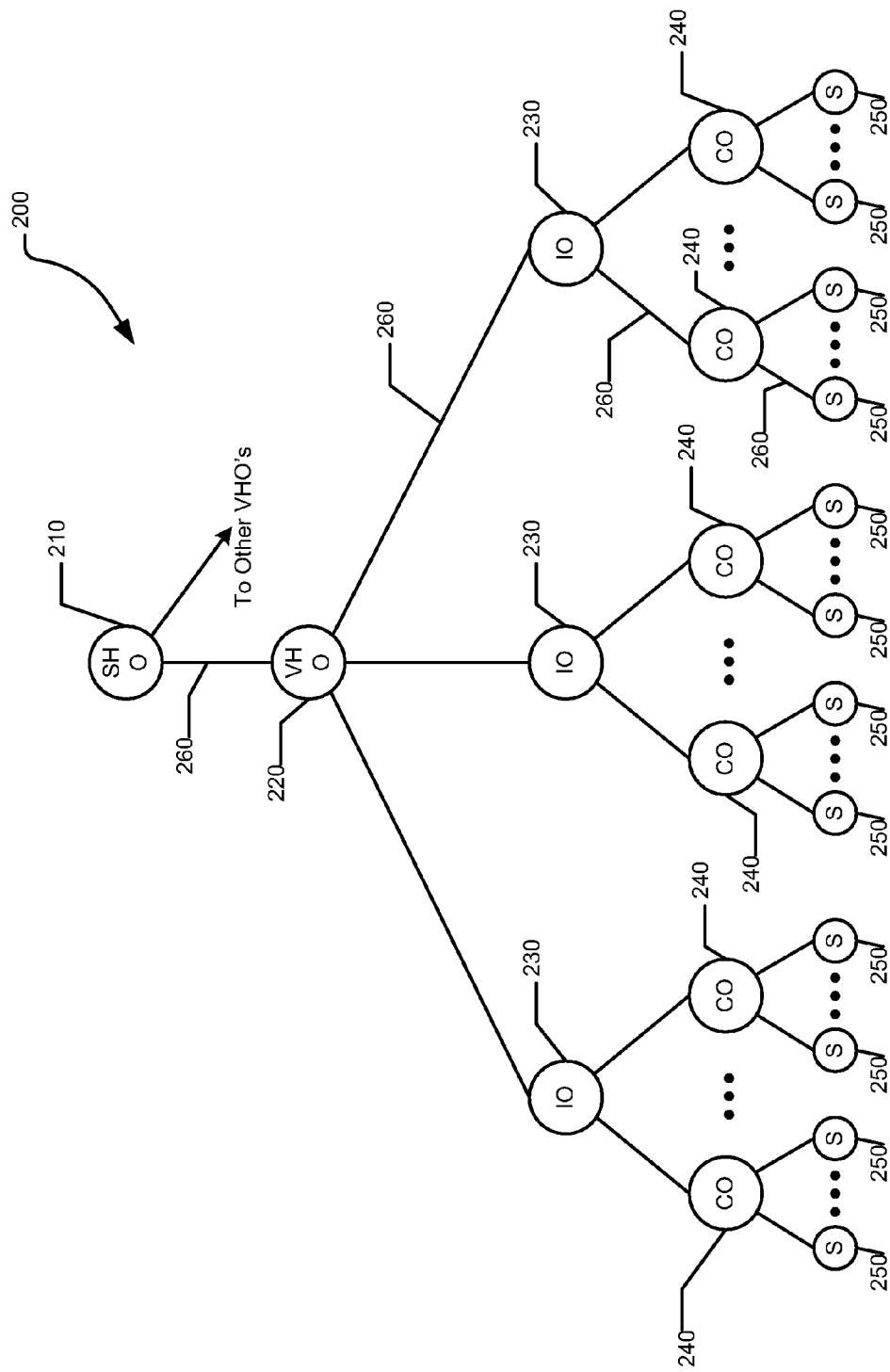
FIGS. 2, 3, and 4 are block diagrams illustrating an embodiment of an IPTV network.

FIG. 2 shows one example embodiment of a television distribution system or network 200, using IPTV technology in this example but not limited thereto, adapted to provide, among other things, the VOD features of the disclosed subject matter. The network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and subscriber(s) 250 who may be located in single or multiple dwelling units. In one example embodiment, the network 200 may be connected through a plurality of high-speed communication links 260 using physical transport layers such as fiber, cable, twisted pair, air, or other media.

In one example embodiment of the IPTV video delivery system, the SHO 210 distributes content to one or more VHOs 220 which may be spread across a wide geographic territory, such as an entire country. The SHO 210 may, for example, be in a central location for acquisition and aggregation of national-level broadcast TV (or linear) programming. A redundant SHO 210 may be provided for backup in case of failure. The SHO 210 may also provide the central point of on-demand content acquisition and insertion into the IPTV network. Linear programming may be received at the SHO 210 via satellite and processed for delivery to the VHO 220. On demand content may be received from various sources and processed/encoded to codec and bit rate requirements for the communication network for transmission to the VHO 220 over the high speed communication links. The VHOs 220 are the video distribution points within each DMA or geographic region.

Figure 3:
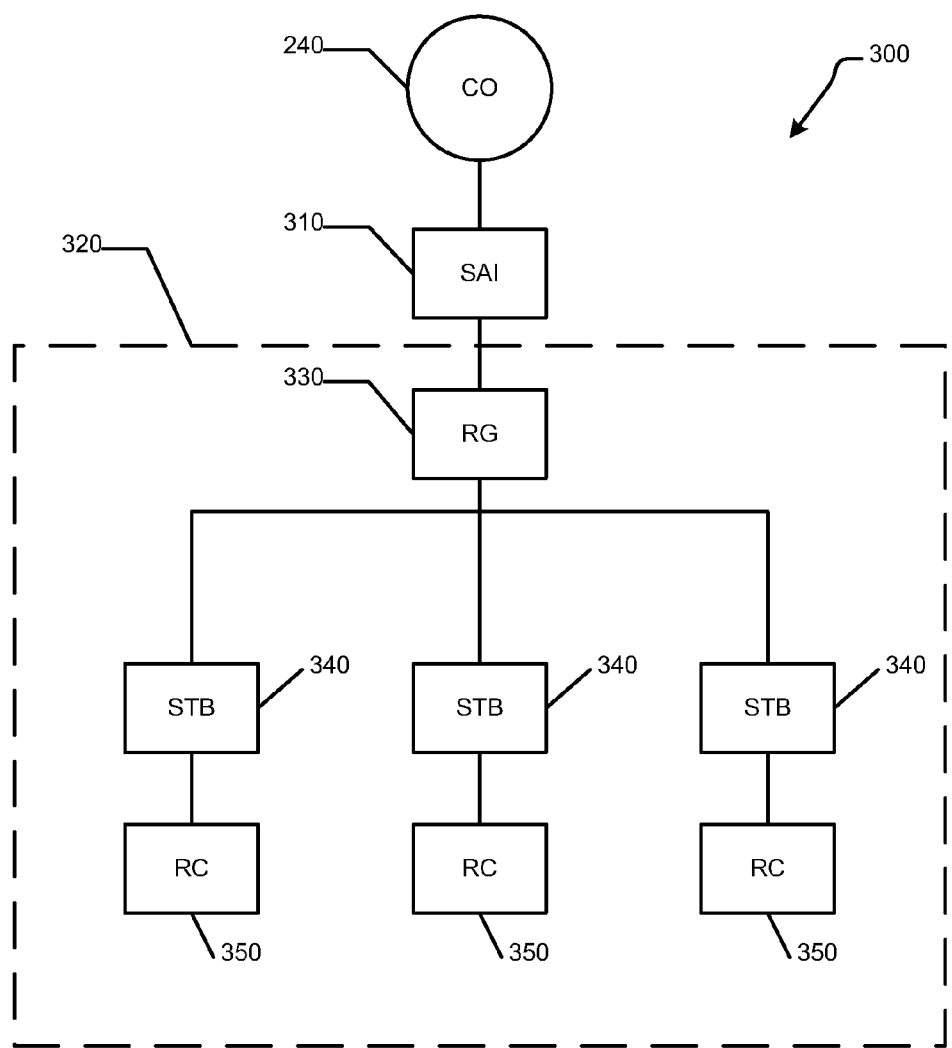

FIG. 3 shows an example network architecture 300 between the CO 240 and the subscriber. A serving area interface (SAI) 310 may be connected to the CO 240. SAI 310 may, for example, be located in a weather-proof enclosure proximate the subscriber premises, and may include fiber-to-the-node (FTTN) equipment. FTTN equipment may also be located in the CO 240. Customer premises equipment (CPE) 320 includes, for example, a network interface device (NID) and a residential gateway (RG) 330, with a built-in very-high-bit rate digital subscriber loop (VDSL) modem or optical network termination (ONT). In either case the RG 330 may be connected to the rest of the home STBs 340 via an internal network such as an Ethernet. Each STB 340 has an associated remote control (RC) 350 that provides data entry to the STB 340 to control the IPTV selections from the IPTV data streams.

Figure 4:
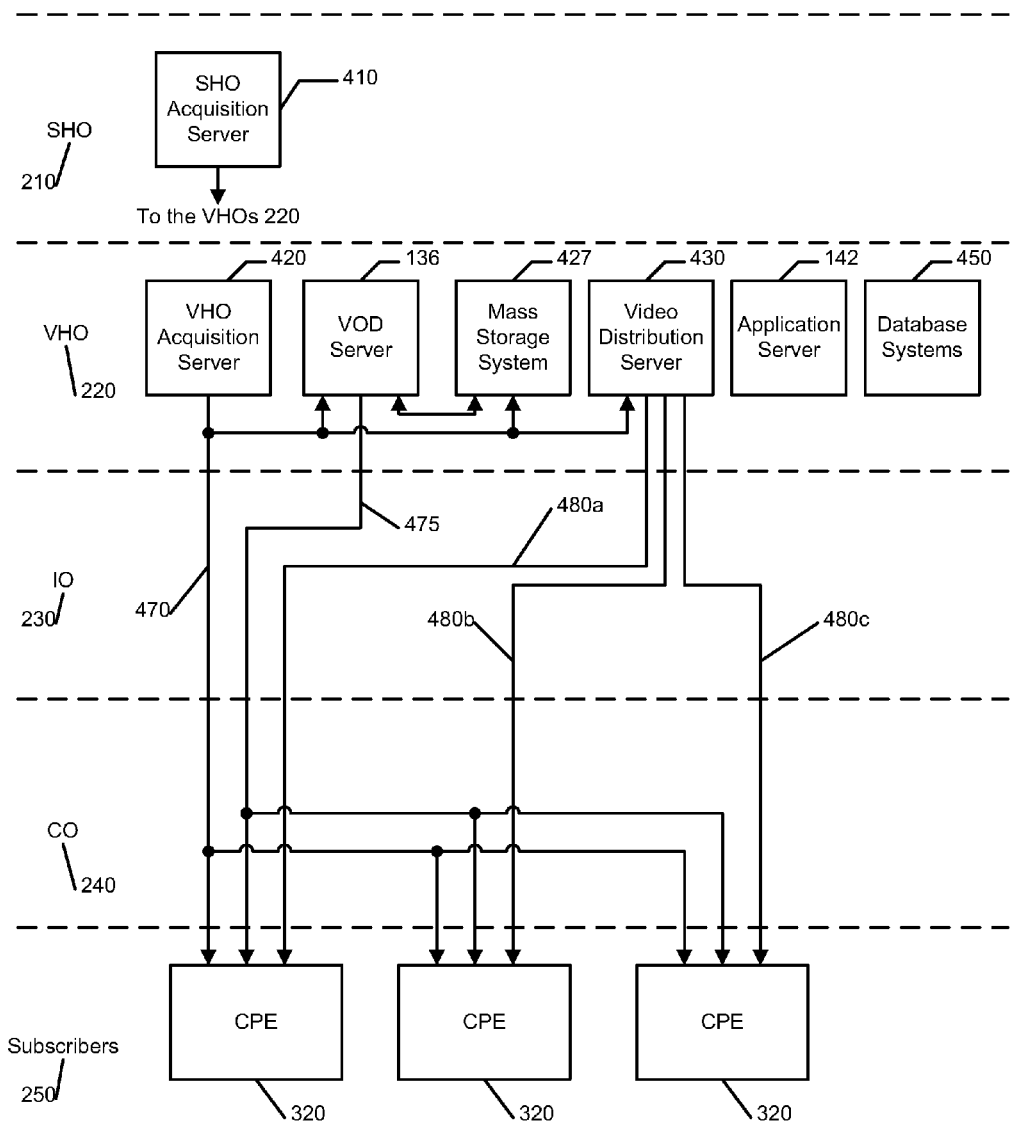

FIG. 4 shows one example embodiment of an SHO acquisition server 410 that may be used to acquire national content to be distributed towards the VHO 220. In an alternative embodiment, live television content may be acquired using an acquisition server 420 in the VHO 220. In this configuration, the VHO 220 may include the live television acquisition server 420 and a video distribution server 430, which forward the live television and/or other content toward the subscribers 250 through the intermediate offices (IOs) 230 and the central office (CO) 240. A VHO 220 may also include application server 142, and regional subscriber 250 database systems 450. The COs 240 are connected to the IOs 230 to further distribute traffic towards the subscribers 250. Traffic may reach the subscribers 250 at least partially via either FTTN or fiber to the premises (FTTP), or by other types of transmission medium.

The acquisition server 420 may distribute a plurality of live television programs, each typically associated with a television "channel," using a multicast IP protocol data stream 470 through the IOs 230 and COs 240 to the subscribers 250. The routers, switches, and other network elements that would normally be present in the IOs 230 and COs 240 are not shown in FIG. 4 in order to simplify the drawing. The number of programs or channels sent in the multicast stream may, without limitation, range up to 800 channels or more using present technology, with it being understood that advances in technology may allow many more channels to be sent. The multicast protocol allows for efficient distribution of these signals to a large number of end subscribers 250. In addition, the video distribution server 430 receives the multicast data stream 470, and distributes selected ones of the live television signals, extracted from the stream 470, using a unicast data stream 480a, 480b, or 480c, to specific subscribers 250.

Also provided in the VHO 220, or alternatively at another distribution point in the IPTV network such as the SHO 210, IO 230, or CO 240, is a VOD server 136 that distributes content to subscribers 250. VOD server 136 may be connected to, in one example embodiment, one or more mass storage devices or systems 427, such as magnetic disk drives or optical recording systems. In addition, VOD server 136 includes software to support interaction with subscribers 250 through STB 340. For example, subscribers 250 can interact with the VOD server 136 using the remote control 350 and an STB 340 to request delivery of the content to them from VOD server 136. The subscribers 250 may request content on VOD server 136, which is delivered, in one example embodiment, with multicast data stream 475. Alternatively, the content may be delivered with a unicast data stream from the VOD server 136 to an individual subscriber 250.

According to one embodiment, access to programming under the control of VOD server 136, or alternatively access to regularly scheduled programming on the television channels, may be controlled by an STB 340 in the subscriber's premises. Thus, in one example embodiment, the VOD server 136 provides television programming upon demand by subscribers 250 as more fully described herein.

According to one example embodiment, referring to FIGS. 3 and 4, TV shows may be monitored on the subscriber 250 side, for example in the STB 340. On the subscriber 250 side, the STB 340 can receive subscriber 250-initiated control commands from, for example the RC 350, such as channel changes, video-on-demand program ordering, and other control information. This information can be used to collect accurate information of all the subscribers's TV viewing information by querying each individual subscriber's STB 340. Alternatively, if such statistics are not available from the STB 340, subscriber 250 viewing information can be obtained from the RG 330 based on IP multicast information obtained from the RG. In another embodiment, the subscriber 250 viewing information may be obtained from the VHO 220 based on, for example, VOD requests sent from the STB 340 to the VOD server 136 in VHO 220. As a result, viewing information can be collected from the VOD server 136 and used to determine the overall viewing of a particular show, such as for billing or determining popularity of the content.

Figure 5:
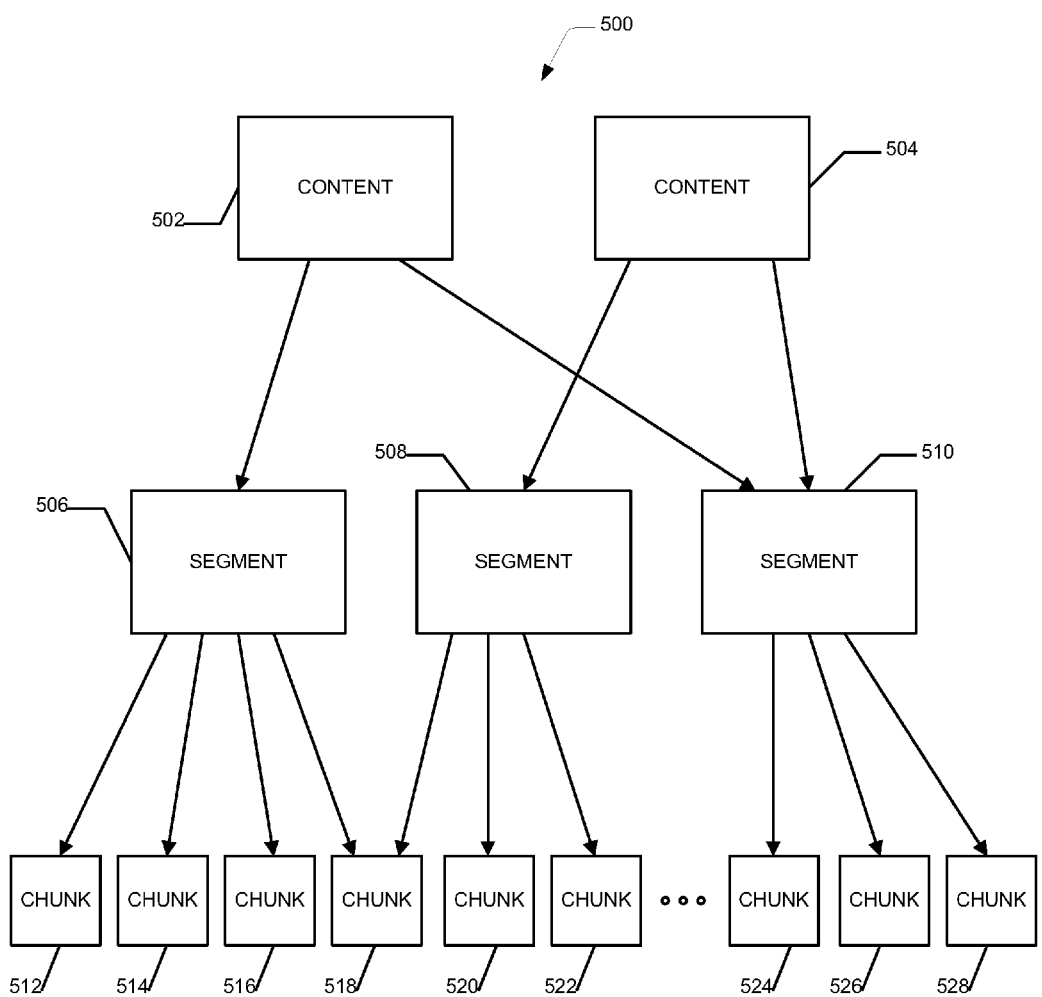
FIG. 5 is a block diagram illustrating an exemplary data model.

FIG. 5 shows an exemplary data model, generally designated 500. Content 502 and 504 can consist of a sequence of segments 506-510. A segment 510 can be part of multiple videos 502 and 504. For example, a segment including the opening or closing credits for a television series can be included in multiple episodes. Segments 506-510 can be comprised of a sequence of chunks 512-528. The size of the chunks 512-528 may be chosen based on several considerations, including typical view size of small videos, amortization of overhead, and resilience to download failures from a serving node. Each chunk 512-528, segment 506-510, and video 502 and 504 can be assigned a globally unique identifier (GUID). Additionally, a chunk 518 may be incorporated into multiple segments 506 and 508 and have multiple GUIDs.

In an exemplary embodiment, a playfile can be provided for each content. The playfile can include the information about the segments and chunks that are part of the content. For example, the playfile may include a list of segment and chunk identifiers in order of playback. Alternatively, the playfile may include a content record including a list each of the segment identifiers in order of playback. The playfile may further include a segment record for each segment identified in the content record. Each segment record may include a list of chunk identifiers and the order of playback. The STB can use the playfile to determine which chunks are needed and in what order for playback of the content.

In an exemplary embodiment, chunks can be sequential audio-video sequences. Chunks can be relatively small, generally not greater than about 180 seconds, preferably not greater than about 60 seconds, and more preferably not greater than about 30 seconds. Alternatively, content can be a software package for distribution. Segments may represent discrete files of the software package with chunks being sequential portions of a file.

In an alternate embodiment, a set of chunks may encode different discrete components of an audio-video stream. For example, a first chunk can encode a video component of a portion of an audio-video stream and a second chunk can encode an audio component of the portion of an audio-video stream. Additional chunks may encode closed captioning information or alternative audio streams. In another example, a first chunk can encode a main video component, and a second chunk may encode a secondary video component to be composited with the first video component. For example, the secondary video component may be overlaid on a television screen within the main video sequence, or may be used to replace an advertisement on a billboard in a scene of a movie. Further, the chunk may encode information regarding rendering a two- or three-dimensional object within the video environment.

In yet another embodiment, chunks can be individually distributed to users to personalize content and advertisements. For example, a first advertising chunk may encode a laundry detergent commercial and a second advertising chunk may encode a sports car commercial. The advertising chunks may be distributed to different subscribers watching the same video content, targeting the laundry detergent commercial to a first subscriber and the sports car commercial to a second subscriber. Additionally, the same advertising chunk may be distributed to subscribers watching different video content, targeting the subscribers with the same commercial. An STB 340 may maintain a profile of subscriber interests to aid in the selection of advertising chunks and may cache advertising chunks for reuse. The server may construct a customized playfile for each STB or set of STBs or the server may provide a generic playfile that can be customized by the STB. For example, the generic playfile may indicate where personalized advertisements may be substituted and the STB can select from a set of personalized advertisements for insertion as appropriate.

In an exemplary embodiment, the subscriber 250 may request video content from the VOD server 136 for viewing. The STB 340 can request chunks that make up each segment of the video content. The STB can request individual chunks or a sequence of chunks. Additionally, the STB 340 may simultaneously request multiple chunks. The chunks may be provided from a single source or from multiple sources. Further, the chunks may be provided sequentially or non-sequentially. For example, the STB 340 may request chunks from multiple segments. In this way, the STB 340 may prefetch and cache later segments of the video content. When the chunks are provided non-sequentially, the STB 340 reorders the chunks to provide the video content.

In an exemplary embodiment, requests for chunks can include a deadline. For example, if a chunk will be used for playback in forty-five seconds, the deadline would indicate delivery of the chunk is required to be complete in not greater than forty-five seconds. The STB 340 may simultaneously request multiple chunks having different deadlines, such that chunks with shorter deadlines can have priority over chunks with longer deadlines. Additionally, the VOD server 136 may aggregate requests from multiple STBs 340 based on the deadline. For example, a first STB may request a chunk with a deadline of forty-five seconds and a second STB may request the chunk with a deadline of thirty seconds. The VOD server 136 may aggregate the requests to provide both the first and second STBs with the chunk within thirty seconds using a multicast stream.

The segments may include information regarding transformation of the chunks. For example, the same content may be available for a variety of devices, such as high-definition television (HDTV), standard definition television (SDTV), computers, and hand-held devices. The segment may include information on providing content with the appropriate resolution to various devices. In an exemplary embodiment, the VOD server may store multiple copies of each chunk at the various resolutions. In an alternate embodiment, the VOD server may store a single copy of each chunk at the highest resolution and transcode to the required resolution as each chunk is requested. In a further embodiment, the VOD server may initially store the highest resolution chunk and store lower resolution chunks as they are requested. For example, the first time a chunk is requested at a lower resolution, the VOD server may transcode the chunk and may store the lower resolution chunk for subsequent requests of the chunk at the lower resolution.

Figure 6:
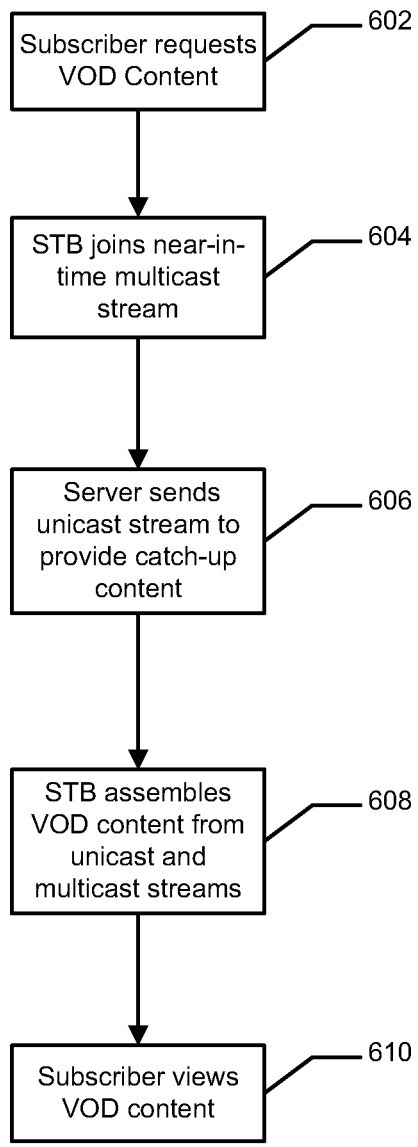
FIG. 6 is a flow diagram illustrating an exemplary method of providing VOD content through a multicast stream.

FIG. 6 shows a flow diagram for providing a multicast stream for VOD content. At 602, a subscriber may request VOD content. At 604, an STB can join a near-in-time multicast stream. The near-in-time multicast stream is an existing multicast stream providing the VOD content to multiple subscribers. The multicast stream allows the server to provide the same VOD content to a relatively large number of subscribers with minimal server overhead. However, the near-in-time multicast stream may be providing a later portion of the VOD content. The STB can cache the VOD content from the multicast stream for later playback. At 606, the VOD server sends a unicast stream to provide catch-up content. The catch-up content can be the portion of the VOD content between the current playback position and the multicast stream position. For example, if the subscriber requests a movie, the STB may join the near-in-time multicast stream five minutes into the movie and catch-up content can include the first five minutes of the movie. At 608, the STB assembles the content from the unicast stream and the near-in-time multicast stream, so that the subscriber can view the VOD content, as illustrated at 610. By combining the unicast catch-up content with the near-in-time multicast content, the subscriber can begin to view the VOD content without waiting for another multicast stream to start from the beginning of the VOD content.

In an exemplary embodiment, the STB may join multiple near-in-time multicast streams to retrieve the VOD content. The number of multicast streams can depend on the available storage capacity and the available bandwidth of the STB. For example, a first multicast stream may be currently providing content from the first segment of a video and a second multicast stream may be currently providing content from a second segment of the video. The STB may join the first multicast stream to receive the first segment and simultaneously join the second multicast stream to receive the second segment. The STB can cache the second segment from the second multicast stream and when the first multicast stream reaches the second segment, the STB can leave the first multicast stream and continue playback from the cached data from the second multicast stream. Additionally, the viewer can jump between the first segment and the second segment, such as by fast forwarding or reversing playback.

Figure 7:
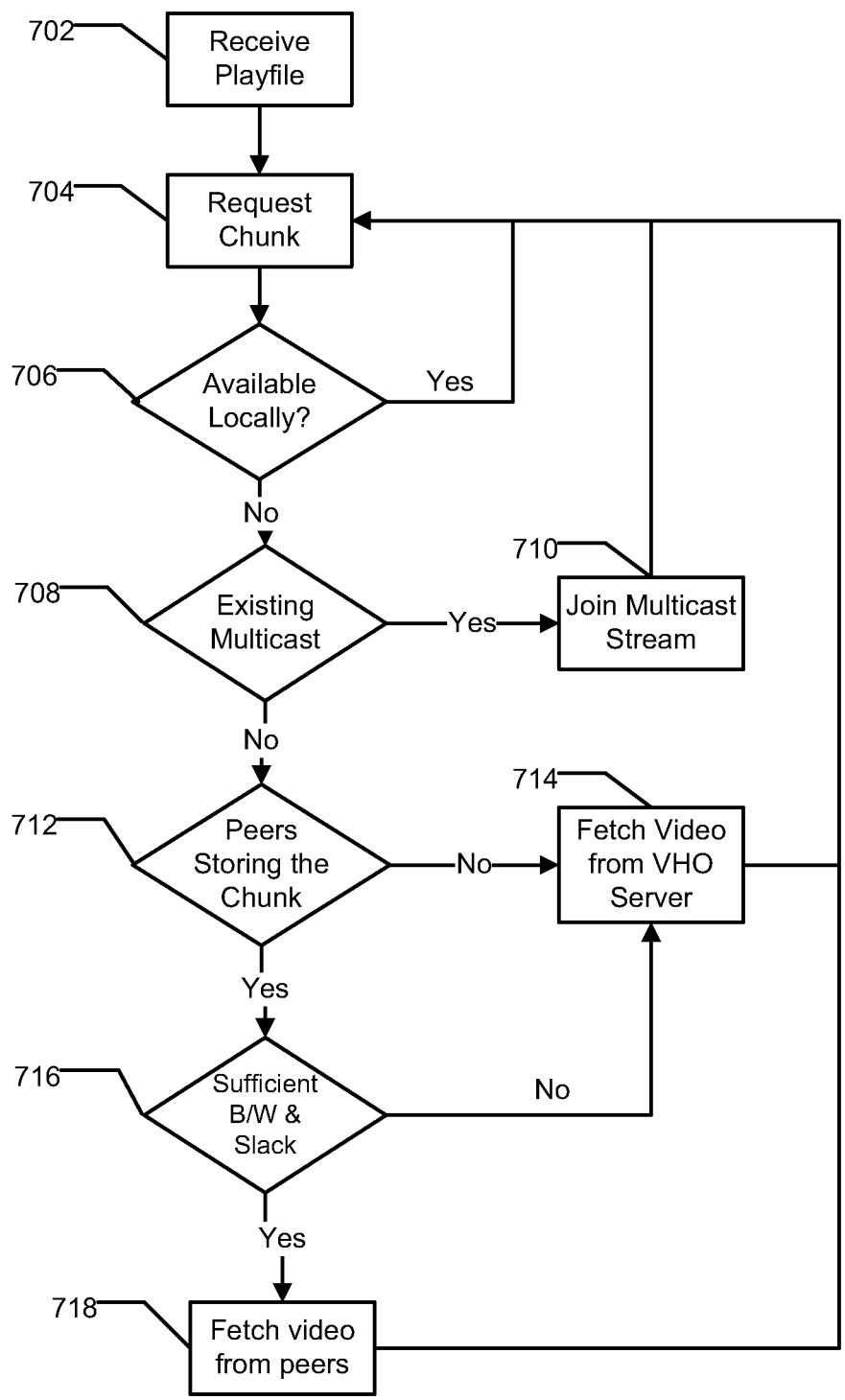
FIG. 7 is a flow diagram illustrating an exemplary method for peer-to-peer distribution of VOD content.

FIG. 7 shows a flow diagram illustrating an exemplary embodiment of peer-to-peer distribution of VOD content. At 702, an STB can receive a playfile for the VOD content. The playfile can identify the segments and chunks that comprise the VOD content. Additionally, the playfile can indicate an order of the chunks required for playback of the VOD content. At 704, the STB can request a chunk identified in the playback file for playback of VOD content. At 706, the STB checks the local cache for the chunk. When the chunk is available from the local cache, the STB can retrieve the chunk from the local cache and may return to 704 to request an additional chunk.

At 708, when the chunk is unavailable from the local cache, the STB can determine if the chunk is available through a multicast stream from a VOD server. The chunk may be immediately available, or the chunk may be scheduled for delivery at a later time. The STB can provide the VOD server with a deadline for receiving the chunk. The chunk can be available through the multicast stream when the chunk is scheduled for delivery within the deadline requested by the STB. When the chunk is available through a multicast stream, the STB can join the multicast stream at 710 and receive the chunk and return to 704 to request an additional chunk. In an embodiment, the STB can continue to receive subsequent chunks through the multicast stream as provided by the VOD server.

When the chunk is not available through a multicast stream from the VOD server, the STB can find a peer storing the chunk, as illustrated at 712. For example, the chunk may be part of a catch-up portion of the VOD content. Alternatively, the chunk may be a portion of the VOD content needed for fast-forwarding. The STB can determine the deadline for the chunk, such as the time the chunk is required for playback. The peers may be peer STBs that are close in the network to the STB, such as connected to the same SAI, or SAIs located within the same CO. Additionally, peer servers may be located throughout the IPTV network, such as at the CO or SAI to cache content close to the subscribers. The STB may send a request to a server to identify which peers are storing the chunk. Alternatively, the STB may send a request to a set of peers to determine which peers are storing the chunk. The request may be a broadcast request to all peers, or it may be directed requests to known peers. Known peers may include peers that have previously requested or served content. When no peer currently storing the chunk is located, the STB can receive the chunk from the VOD server at 714 and return to 704 to request an additional chunk.

At 712, when a peer storing the chunk is found, the availability of upload bandwidth from the peer can be determined, as illustrated at 716. When there is sufficient upload bandwidth for the peer to deliver the chunk in the available time, the STB can receive the chunk from the peer, as illustrated at 718 and may return to 704 to request an additional chunk.

When there is insufficient upload bandwidth to deliver the chunk in the required amount of time, or the peer refuses to deliver the chunk, the STB can fetch the chunk from the VOD server as illustrated at 714. The peer may refuse to deliver the chunk when a number of concurrent chunk uploads exceeds a maximum number or the peer exceeds a maximum upload bandwidth. Further, the STB may return to 704 to request an additional chunk.

In an exemplary embodiment, peers can be members of a separate autonomous system. The STB may be able to communicate with a peer in a separate autonomous system through another communication network, such as a Wi-Fi connection. The STB and the peer may negotiate an agreement governing the chunk transfer. For example, the service provider for the STB and the service provider for the peer may have a reciprocal arrangement where a limited number of chunks can be shared between the autonomous systems. Alternatively, the service provider for the STB may pay the service provider for the peer for delivery of the chunk to the STB. Additionally, content providers and/or network providers may establish policies regulating the transfer of chunks across autonomous system boundaries.

In an exemplary embodiment, requests for additional chunks may be streamlined. For example, if a peer is found to provide a first chunk, the STB may retrieve additional available sequential chunks from the peer without searching for an alternative peer. Alternatively, if no peer is found with a first chunk or if the first chunk is provided through a multicast stream, the STB may retrieve several sequential chunks from the VOD server without searching for a peer for a subsequent chunk. For example, the VOD server may establish a multicast stream to provide a sequential series of chunks, such as a remaining portion of the content. The STB may join the multicast stream to receive the sequential series of chunks without attempting to identify additional sources of the chunks provided by the multicast stream.

In another exemplary embodiment, the STB may receive chunks from more than one peer. For example, the STB can receive a first chunk from a first peer while receiving a second chunk from a second peer. Utilizing multiple sources for the chunks can decrease the time required to receive multiple chunks when the available upload bandwidth of a peer is less than the available download bandwidth of the STB.

In yet another exemplary embodiment, the request may include a deadline. The STB can request multiple chunks with different deadlines, such as a first chunk with a relatively short deadline and a second chunk with a relatively long deadline. A peer storing the first and second chunks may not be able to provide the first chunk by the short deadline but could provide the second chunk by the long deadline. The STB may retrieve the first chunk from the VOD server and the second chunk from the peer.

In a further exemplary embodiment, the VOD server may preload an STB with popular content to reduce the startup delay. Popular content can include popular movies, popular segments, and popular chunks. For example, the STB may cache an initial segment or set of chunks, such as the first five minutes of a recently released movie. Additionally, the STB may be prepopulated with popular jump points, such as a popular segment of a movie. Further, the STB may be prepopulated with a popular set of chunks, such as a video segment shared between multiple programs. Preloading an initial segment or set of chunks can reduce the startup delay that is needed when viewing a movie that is transmitted as a multicast stream. Globally popular content could be determined based on the total number of views over a period of time, such as a day, a week, or a month. Additionally, regionally popular content could be identified based on the number of regional views over a period of time. Regional information may be obtained at multiple points within the VOD system, such as the SAIs, COs, or the IOs.

In an embodiment, preloading content can be sent to all STBs. In an alternate embodiment, preloaded content can be provided to a geographically distributed subset of STBs. The subset of STBs may be selected such that there is a high probability that the preloaded content is available from at least one of the STBs connected to an SAI. For example, one STB at each SAI may be provided with preloaded content. By distributing preloaded content to a subset of STBs, the total amount of preloaded content could be increased. For example, several STBs, each having a different set of preloaded content, may be connected to an SAI. Further, using individual viewing history may enhance distribution of preloading content. For example, individual viewing history may identify content likely to appeal to a subscriber that could be preloaded. Additionally, individual viewing history may identify which STB within the SAI is more likely to require the preloaded content.

In another embodiment, a mobile device, such as cell phone 184 or a laptop computer, may receive and play back VOD content. The chunks may be transcoded at a VOD server or at an STB to a lower bit rate format appropriate for the mobile device prior to delivery. As a transcoded chunk may no longer be appropriate for playback on an STB, the mobile device may limit sharing of the transcoded chunk to other mobile devices.

Additionally, the mobile device may choose a delivery method based on the connection type and upload/download bandwidth. For example, when the mobile device is connected through a low bandwidth connection, such as certain cellular networks, the mobile device may utilize "download-and-play" or progressive download for the content instead of streaming to provide more tolerance to network disruptions. Additionally, the mobile device may be limited to client-server delivery of the content rather than providing chunks to additional mobile devices. Alternatively, with a higher bandwidth connection, such as WiFi, WiMAX, and higher speed cellular networks, the mobile device may receive and display streaming content as well as establish peer-to-peer relationships to share chunks with other mobile devices within the same wireless network or subnetwork. Additionally, the mobile device may prefetch some segments or chunks to accommodate switching between high and low speed networks.

Figure 8:
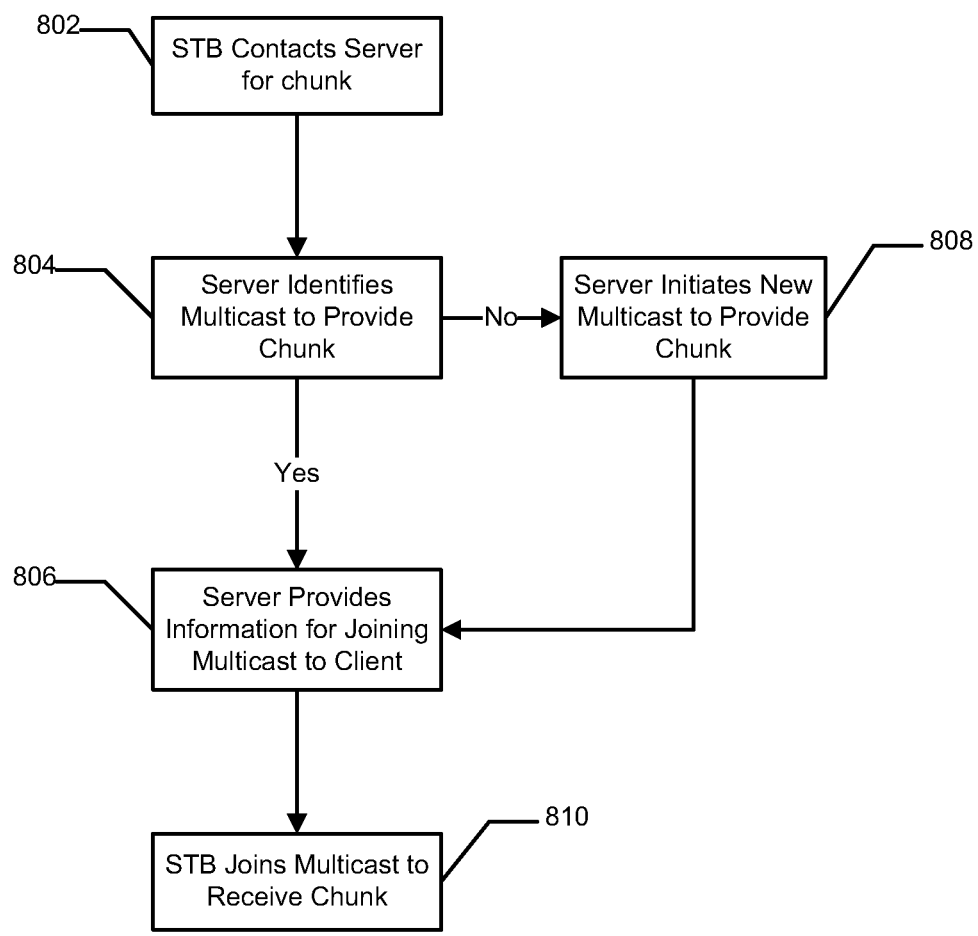
FIG. 8 is a flow diagram illustrating an exemplary method for providing VOD content.

FIG. 8 shows a flow diagram of an exemplary method for providing multicast VOD content, generally designated 800. As illustrated at 802, the STB contacts the VOD server for a chunk, such as when the chunk is not available from a peer prior to the deadline or no peer has the chunk. At 804, the server searches for a multicast stream that can provide the chunk. When a multicast stream is identified, the VOD server provides the STB with information for joining the multicast stream, as illustrated at 806.

Alternatively, when a multicast stream to provide the chunk is not found, such as when the stream will not provide the chunk by the deadline or no other STBs require the chunk, the VOD server may initiate a new multicast to provide the chunk, as illustrated at 808. The VOD server can provide the STB with information for joining the multicast stream, as illustrated at 806. The STB may join the multicast session to receive the chunk, as illustrated at 810. In an alternate embodiment, the VOD server may provide the chunk through a unicast stream to the STB. The VOD server may combine multiple unicast streams for the chunk into a single multicast stream when a sufficient number of unicast steams for the chunk have been scheduled.

In an exemplary embodiment, the VOD server may delay a multicast stream, such as until just prior to the deadline. When a multicast stream is delayed, additional STBs may join the stream. If the VOD server receives a request for the chunk with an earlier deadline, the delay for the multicast stream is adjusted to end just prior to the earlier deadline.

In another exemplary embodiment, the VOD server may provide information for joining the multicast stream to a random set of additional STBs not requesting the chunk. When an additional STB has sufficient bandwidth and storage, the STB may join the multicast stream. In this way, the chunks with low peer-to-peer availability may be prepopulated.

Figure 9:
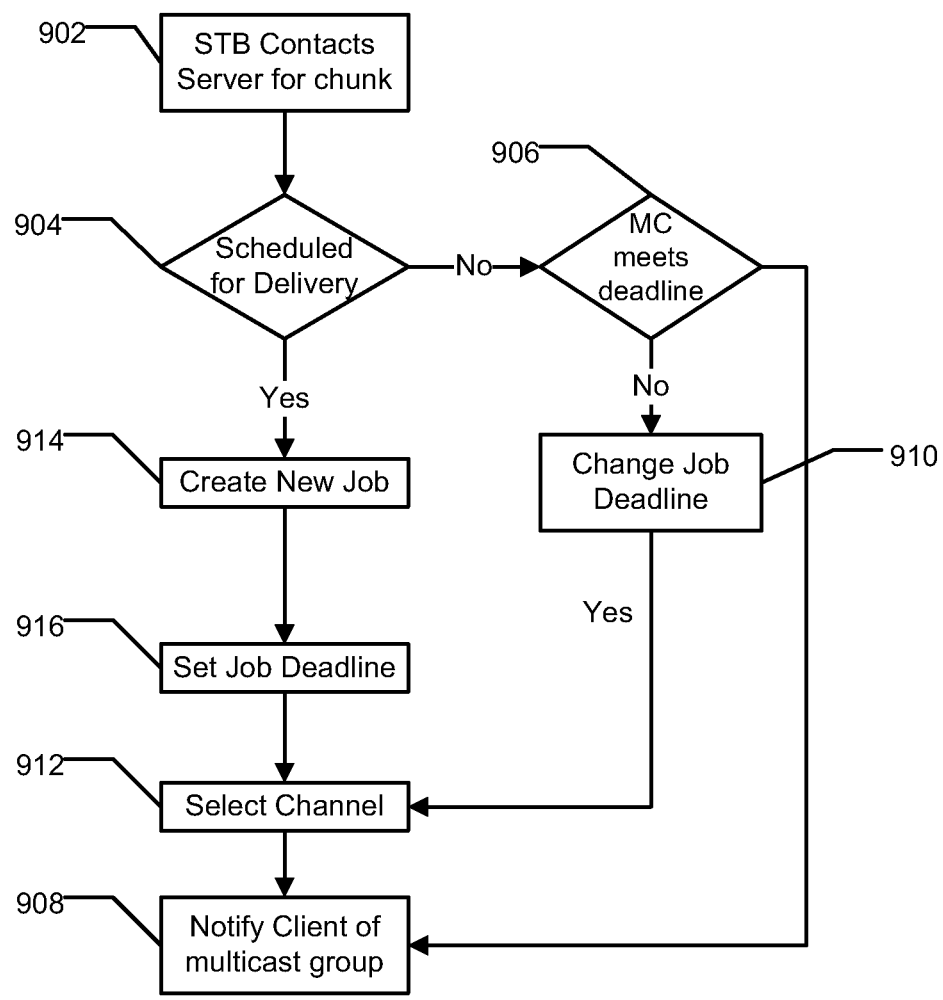
FIG. 9 is a flow diagram illustrating an exemplary method for scheduling delivery of VOD content.

FIG. 9 shows a flow diagram of an exemplary method for scheduling the delivery of chunks via multicast. At 902, a server can receive a request for a chunk from an STB. The server may be a VOD server or a caching server located at the IO, the CO, the SAI, or elsewhere in the video distribution network. The request can include the GUID for identifying the chunk as well as a deadline requested for delivery of the chunk. The deadline requested by the STB may indicate a time by which all of the chunk must be received by the STB. At 904, the server can determine if the chunk is currently scheduled for delivery. When the chunk is currently scheduled for delivery, the server can determine if the scheduled delivery of the chunk meets the deadline provided by the STB, as illustrated at 906. When the scheduled delivery of the chunk meets the deadline, the server can provide the STB with information needed to join the multicast session to receive the chunk, as illustrated at 908.

As illustrated at 910, when the scheduled delivery of the chunk does not meet the deadline, the server can change the job deadline for delivery of the chunk to meet the deadline requested by the STB. The job deadline may indicate a time at which delivery of the chunk must begin in order to meet the deadline requested by the STB. The job deadline can be determined based on a size of the chunk, a transmission rate, and the deadline requested by the STB. Scheduling last minute delivery of the chunk can allow STBs that later request the chunk to receive the chunk through the multicast scheduled for delivery of the chunk. In an alternate embodiment, the server may initially schedule the chunk for delivery through a unicast and change to multicast delivery if the number of STBs requesting delivery of the chunk exceeds a threshold. At 912, the server can select a channel for delivery of the chunk and provide the STB with information on joining the multicast group to receive the chunk, as illustrated at 908.

Returning to 904, when the chunk is not currently scheduled for delivery, the server can create a new job for delivering the chunk, as illustrated at 914. The job may identify the chunk to be delivered and identify the STBs that requested the chunk. At 916, the server can set a job deadline for delivery of the chunk to satisfy the deadline requested by the STB. At 912, the server can select a channel for delivery of the chunk and provide the STB with information on joining the multicast group to receive the chunk, as illustrated at 908. In an embodiment, the server may deliver the chunk through a multicast stream only when there are a sufficient number of concurrent requests for the chunk. The server may initially schedule a unicast stream to deliver the chunk to a first STB. Upon receiving a sufficient number of requests from additional STBs, the server may consolidate the requests into a single multicast stream to deliver the chunk and notify all the STBs requesting the chunk to receive the chunk through the multicast stream instead of through individual unicast streams.

Figure 10:
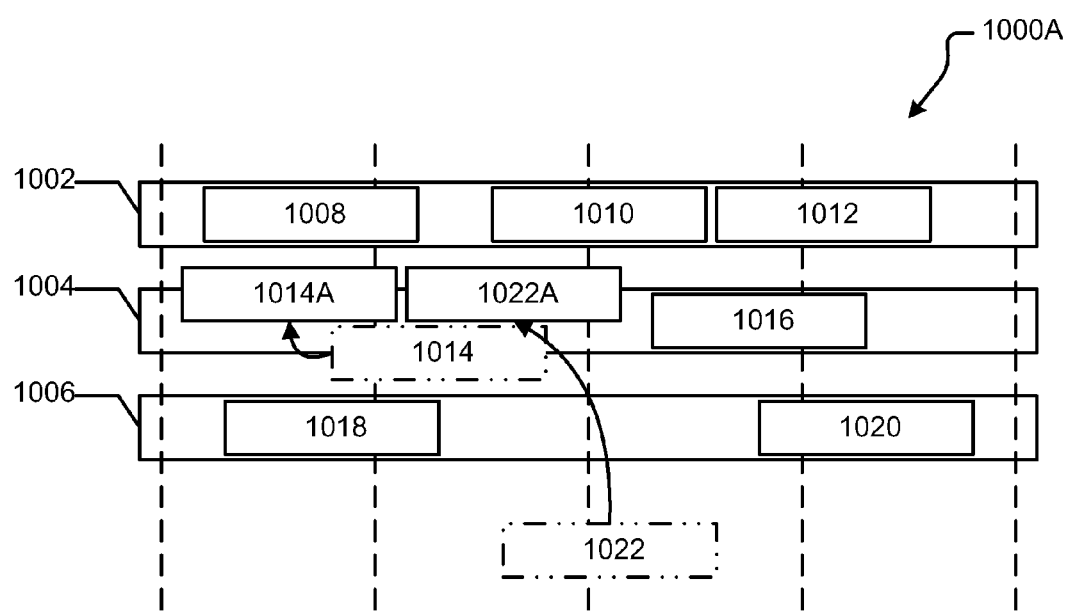
FIG. 10 is a schematic diagram illustrating the scheduling of VOD content for delivery.

FIG. 10 shows a schematic diagram illustrating a schedule for delivering chunks, generally designated 1000. A server can have a number of channels 1002 through 1006 for multicast of chunks 1008 through 1022. When the server receives a request for a chunk that is not currently scheduled or reschedules chunk delivery due to a request with an earlier deadline, the server can attempt to identify a channel for delivery of the chunk. Chunks 1008, 1010, and 1012 can be currently scheduled for delivery on channel 1002, chunks 1014 and 1016 can be currently scheduled for delivery on channel 1004, and chunks 1018 and 1020 can be currently scheduled for delivery on channel 1006.

When the server receives a request for delivery of chunk 1022, the server can attempt to schedule delivery of chunk

1022 on one of channels 1002 through 1006. For each channel, the server can determine if there was sufficient time available to deliver chunk 1022 prior to the deadline. The server can identify all chunks for which delivery will be complete prior to the requested deadline for chunk 1022. For channel 1002, the server can determine that chunk 1008 would have to complete delivery prior to the requested deadline for chunk 1022. The server can also identify all gaps in the schedule prior to the requested deadline for delivery of the chunk 1022. For channel 1002, the identified gaps can include the time prior to delivery of chunk 1008 and the time between the end of chunk 1008 and the beginning of chunk 1010 as chunk 1010 will also have to start before the requested deadline for chunk 1022. The server can compare the length of the identified gaps to the length of time required for delivery of chunk 1022 to determine if there is sufficient time on a channel for delivery of chunk 1022. For channel 1002, the sum of the gaps can be shorter than the time required for delivery of chunk 1022, indicating that channel 1002 is not available for delivery of chunk 1022.

Turning to channel 1004, chunk 1014 is scheduled for delivery prior to chunk 1022 and the identified gaps include the time prior to the start of chunk 1014 and the time between the end of chunk 1014 and the beginning of chunk 1016 as chunk 1016 will start prior to the requested deadline for chunk 1022. The sum of the gaps for channel 1004 can be longer than the time required for delivery of chunk 1022, making channel 1004 available for delivery of chunk 1022. The server can move the delivery of chunk 1014 earlier to timeslot 1014A and schedule chunk 1022 for delivery in timeslot 1022A.

In an embodiment, the server may identify a channel in which no scheduled chunks overlap with the delivery of chunk 1022. Turning to channel 1006, delivery of chunk 1022 could occur in the gap between delivery of chunk 1018 and chunk 1020, such that scheduling delivery of chunk 1022 on channel 1006 may not require rescheduling of chunk 1018.

Figure 11:
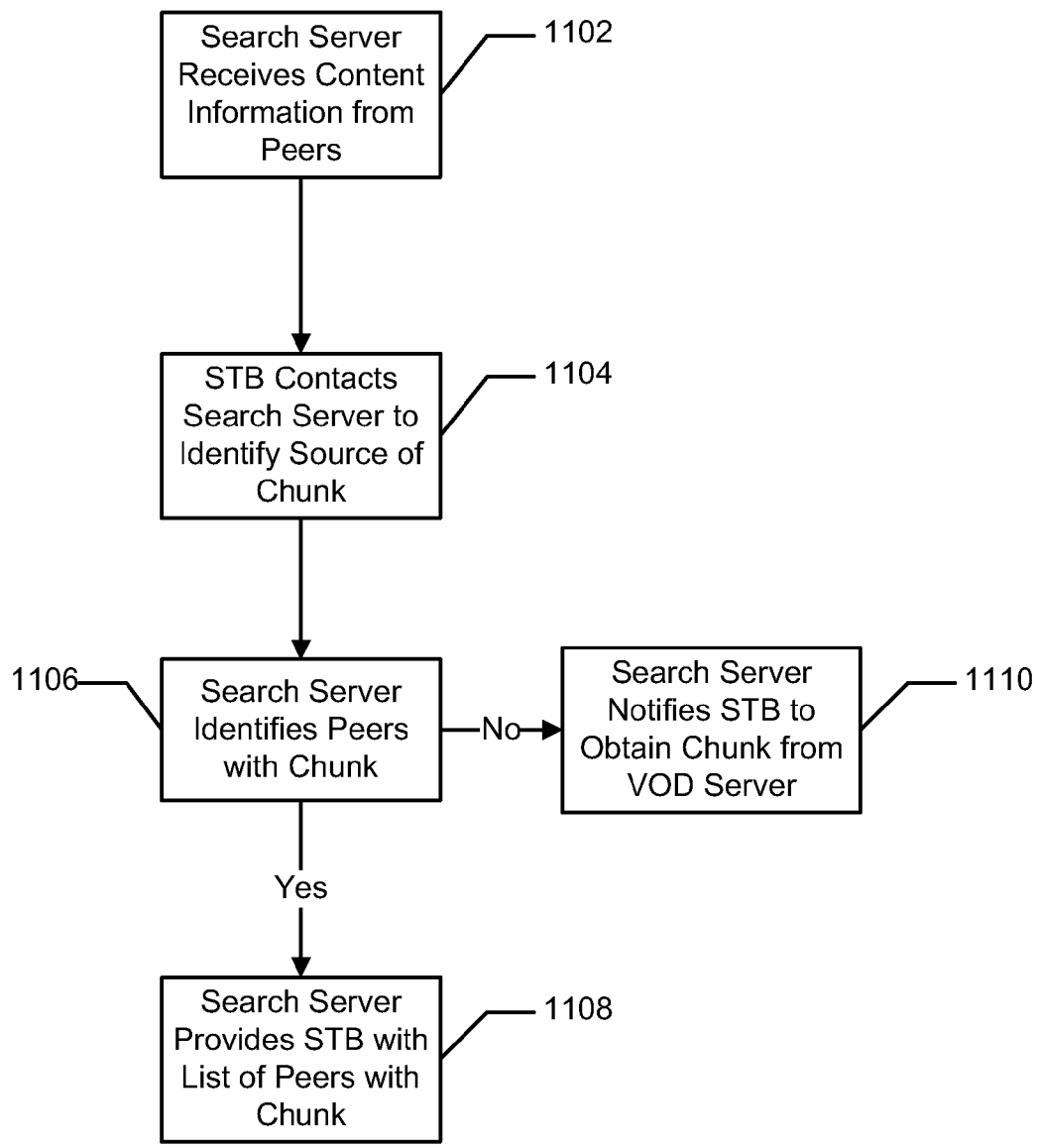
FIGS. 11 and 12 are flow diagrams illustrating exemplary methods for identifying sources for VOD content.

FIG. 11 shows a flow diagram of an exemplary method for identifying sources for VOD content. As illustrated at 1102, a server such as a directory server may receive information about the chunks stored on each STB. For example, when an STB receives a chunk, the STB may provide the server with the GUID of the chunk received. The STB can also provide the server with the GUIDs of chunks that are deleted from the STB. The server can store topology information, such as information identifying the IO, CO, and SAI to which an STB is connected. Additionally, the server can store rating information for an STB. The rating information may be based on the upload bandwidth available to the STB and reliability of the STB such as how often the STB is unavailable or refuses to share a chunk. Further, the server can store policy information, such as policies used to identify peer groups. In an embodiment, the policies may depend on the time of day/day of week and network usage patterns. For example, a policy may limit a peer group to peers connected to a common SAI during times of heavy network usage, such as early evening, or may limit a peer group to peers connected to a common CO during times of light network usage, such as the early morning.

At 1104, an STB can contact the server to identify the source of a chunk. The server may compare information from peers to identify peers that have the chunk, as illustrated at 1106. In an exemplary embodiment, the server may utilize topology information to search information from peers connected to the same SAI prior to searching information from peers connected to an SAI located at the same CO. When a peer is found with the chunk, the server can provide a list of peers with the chunk to the STB, as illustrated at 1108. In an exemplary embodiment, the server may provide a partial list of peers to the STB, based on proximity of the peers. Alternatively, at 1110, when no peer is identified with the chunk, the server can notify the STB that the chunk needs to be requested from the VOD server.

In an exemplary embodiment, the information may be distributed across a distributed network of servers. The distributed network of servers may utilize distributed hash tables for storage and lookup of chunk locations. A server located at a CO may manage content distribution between STBs connected to the CO. The server can receive chunk notifications and handle search requests from the local STBs. Additionally, the server can rate the local STBs and monitor popularity of content. The server may receive policy updates from a master server located at the SHO or VHO. The master server can provide a central point for managing the policies across the network. Additionally, the server may provide local popularity information to the master server. The master server can aggregate local popularity information from servers located across multiple COs to determine regional and/or national popularity of content.

Figure 12:
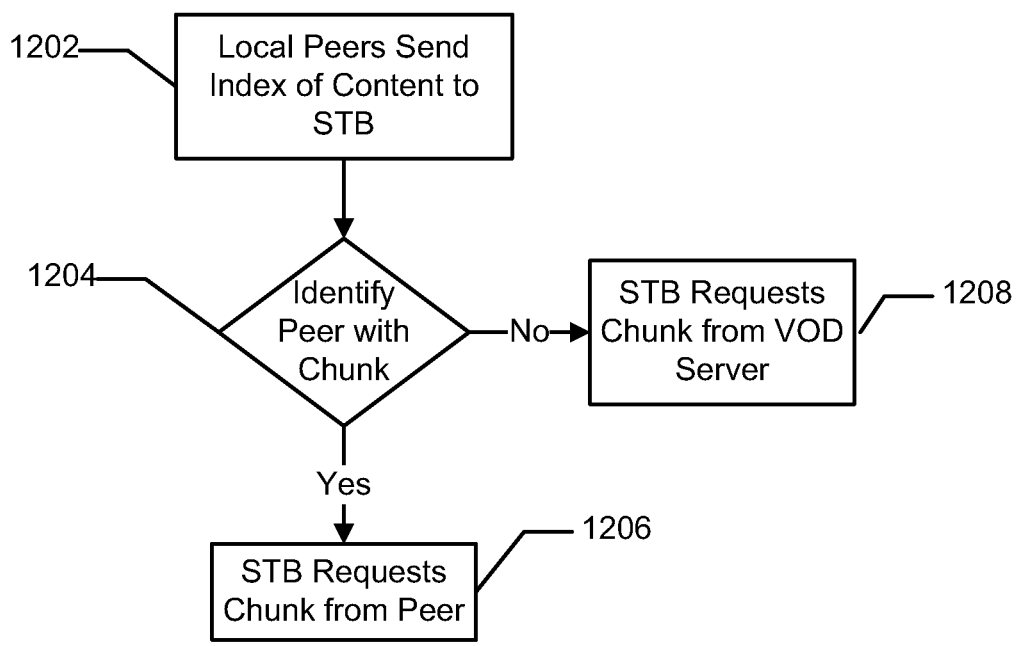

FIG. 12 shows a flow diagram of a further exemplary method for identifying sources for VOD content. At 1202, local peers send an index of content to an STB. For example, local peers may periodically broadcast an update containing the GUIDs of stored chunks. Alternatively, local peers may broadcast the GUID of a chunk that is received or deleted. The STB may combine the indices from multiple local peers to form a local view. The local view can identify which peers have a GUID. When a chunk is needed, the STB can search the local view for a peer having the chunk, as illustrated at 1204. When the STB identifies a peer with the chunk, at 1206, the STB may request the chunk from the peer. In an exemplary embodiment, when the STB identifies multiple peers having the chunk, the STB may request the chunk from the peer with the most available bandwidth. Alternatively, at 1208, when the STB does not identify a peer with the chunk, the STB may request the chunk from the VOD server.

Figure 13:
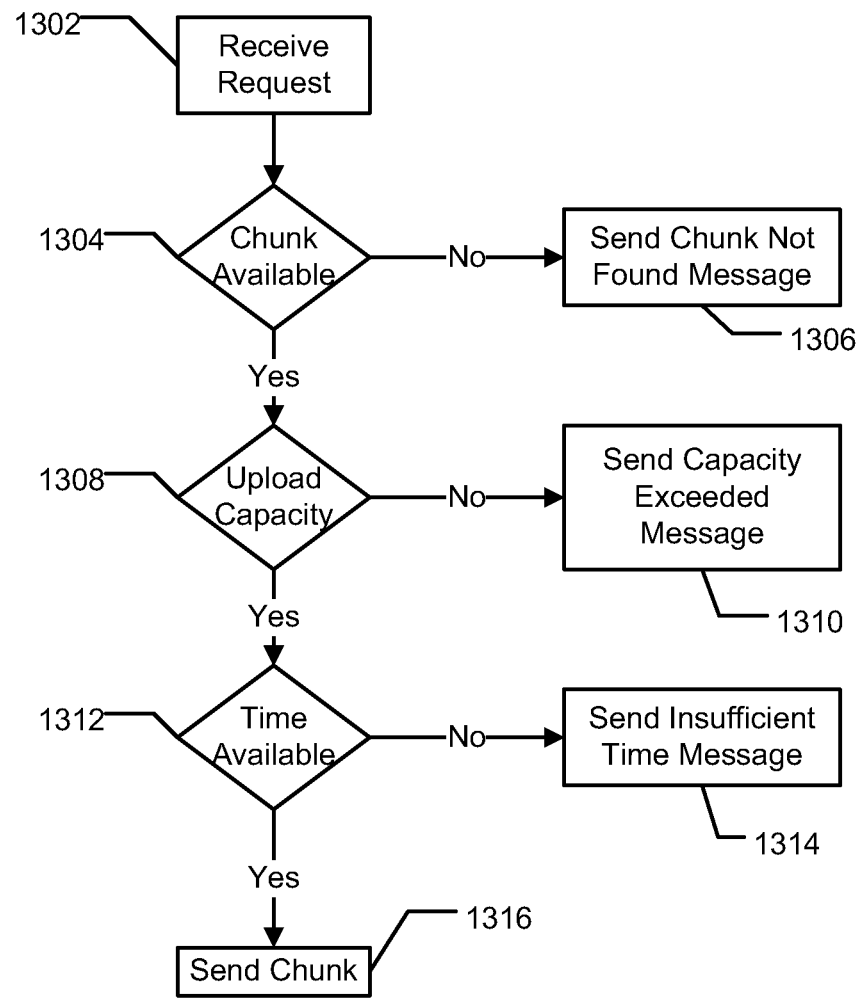
FIG. 13 is a flow diagram illustrating an exemplary method for determining if VOD content is available for sharing.

FIG. 13 shows a flow diagram of an exemplary method for determining if a chunk is available for sharing. As illustrated at 1302, a peer can receive a request from an STB. In an embodiment, the STB can send a request to an individual peer identified by a directory server or from a local view. In an alternate embodiment, the STB can send a broadcast query for a chunk to local peers. The query may be broadcast to all peers within a local group, such as those connected to the same SAI, or those connected to SAIs within the same CO. The peer can determine if the peer is storing the chunk, such as by comparing the GUID from the query to an index of stored chunks, as illustrated at 1304. When the peer finds that the chunk is not available, at 1306, the peer can send a message indicating the chunk was not found to the requesting STB.

Alternatively, when the peer determines that the chunk is available, the peer can determine if there is sufficient upload capacity to deliver the chunk to the requesting STB, as illustrated at 1308. The upload capacity can be a function of the number of chunks being currently served and the total upload bandwidth available to the peer. When the peer determines that the upload bandwidth is insufficient, the peer can send a message indicating that the capacity has been exceeded to the requesting STB, as illustrated at 1310. The peer may have insufficient bandwidth when the number of chunks being currently served is at or exceeds a maximum number of allowable streams. Alternatively, the peer may have insufficient bandwidth when current upload bandwidth exceeds a percentage of the available upload bandwidth. The upload bandwidth may be shared with additional devices, such as computers, and network activity of those devices may affect the current upload bandwidth.

Alternatively, when the peer determines there is sufficient upload capacity, the peer can determine if there is sufficient time to deliver the chunk to meet the deadline requested by the STB, as illustrated at 1312. When the peer determines that the time is insufficient to meet the requested deadline, the peer can send a message indicating there is insufficient time to serve the requested chunk, as illustrated at 1314. Alternatively, when the peer determines that the time is sufficient, the peer can notify the STB that the peer is available to serve the chunk and provide the chunk to the STB, as illustrated at 1316. In an embodiment, the peer may schedule a multicast as previously described.

Figure 14:
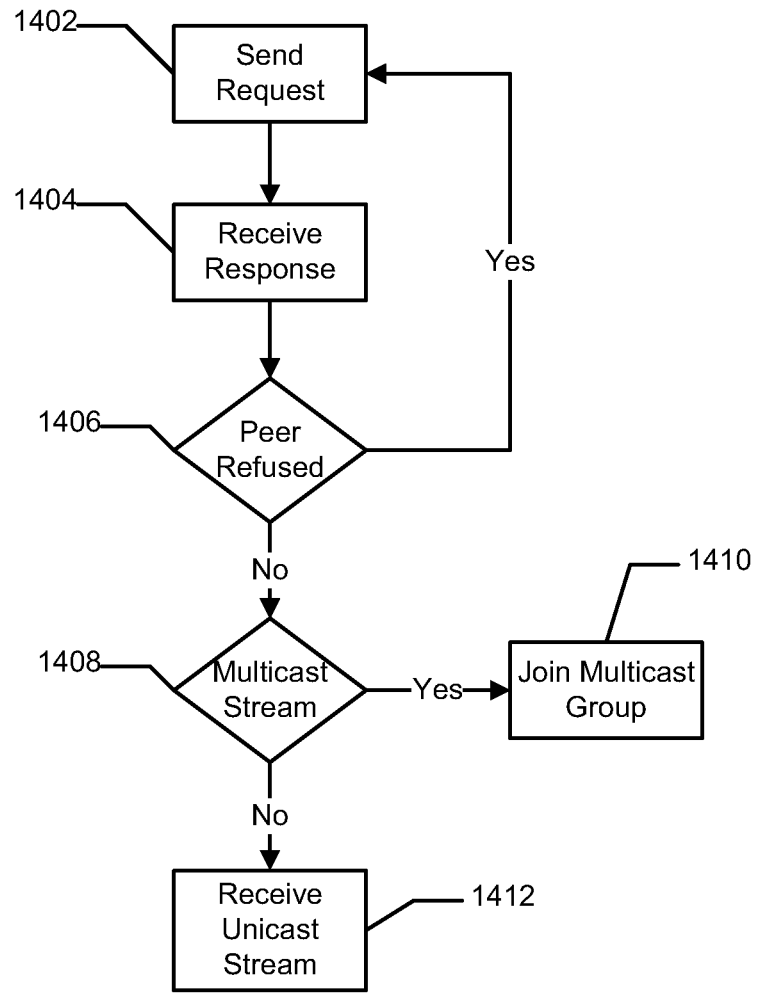
FIG. 14 is a flow diagram illustrating an exemplary method for receiving VOD content.

FIG. 14 shows a flow diagram of an exemplary method for receiving a chunk. At 1402, an STB can send a request for a chunk. The request can be sent to a peer STB or to a cache server. The request can include a GUID of a requested chunk and a requested deadline by which the chunk should be received. At 1404, the STB can receive a response to the request. At 1406, the STB can determine if the response indicates the peer refused to provide the chunk. When the response indicates the peer refused to provide the chunk, the STB can return to 1402 to request the chunk from another peer or cache server or the STB can request the chunk from the VOD server. The peer may refuse to provide the chunk when the peer does not have the chunk, when the peer does not have the available upload bandwidth, or when the peer cannot provide the chunk by the requested deadline.

Alternatively, when the message indicates the server can provide the chunk, the STB can determine if the message indicates the chunk will be provided through a multicast stream, as illustrated at 1408. When the message indicates the chunk will be provided through a multicast stream, the message may include information about joining a multicast group to receive the chunk. At 1410, the STB can join the multicast group and receive the chunk. In an exemplary embodiment, a peer may utilize a multicast stream to provide a chunk to multiple STBs. Alternatively, when the message indicates the chunk will be provided through a unicast stream, the STB can wait to receive the chunk over the same connection, as illustrated at 1412.

Figure 15:
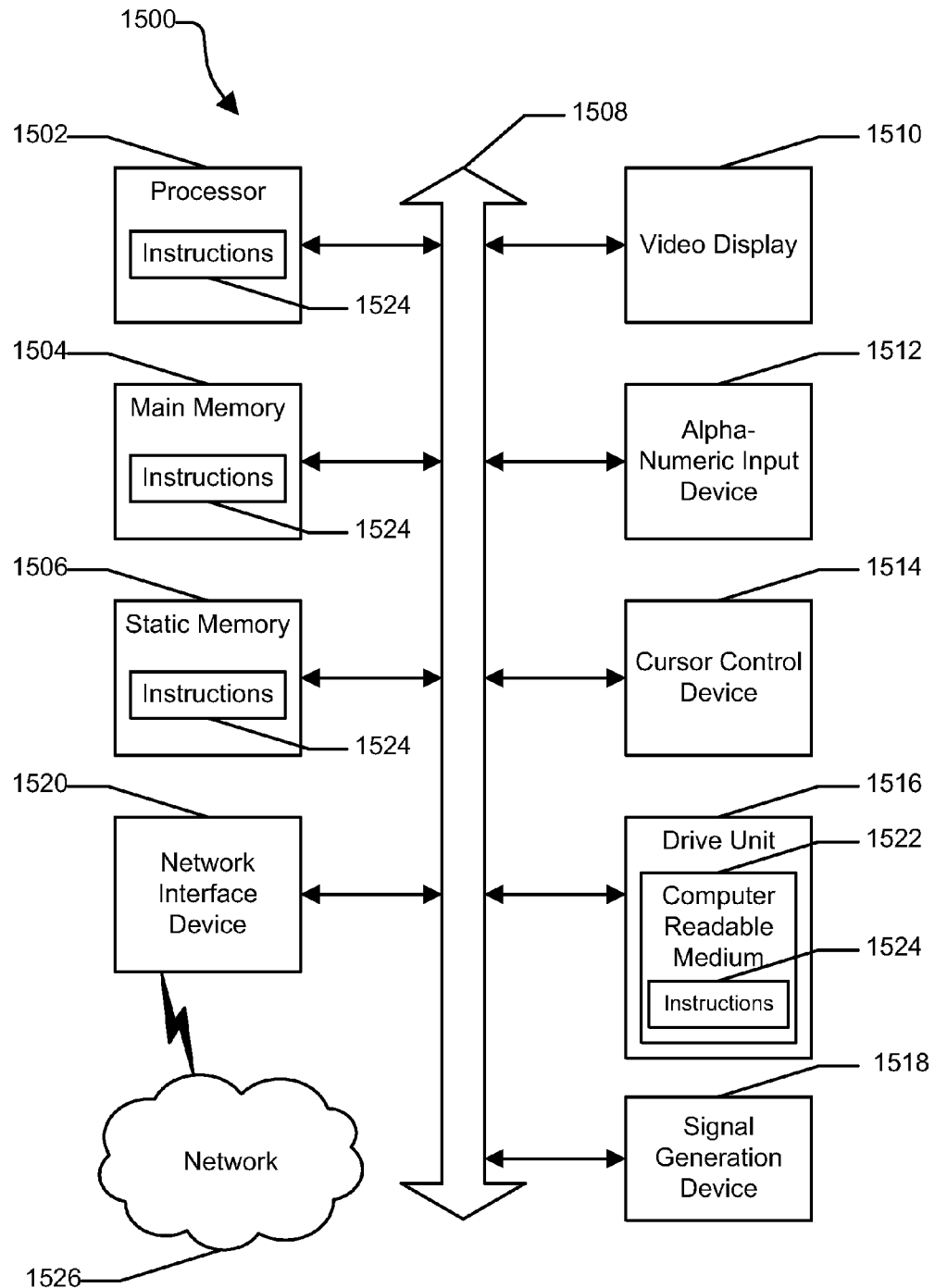
FIG. 15 is an illustrative embodiment of a general computer system.

FIG. 15 shows an illustrative embodiment of a general computer system 1500. The computer system 1500 can include a set of instructions that can be executed to cause the computer system to perform any one or more of the methods or computer based functions disclosed herein. The computer system 1500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1500 can be implemented using electronic devices that provide voice, video or data communication. Further, while a single computer system 1500 is illustrated, the term "system" shall also be taken to include any collection of systems or sub-systems that individually or jointly execute a set, or multiple sets, of instructions to perform one or more computer functions.

The computer system 1500 may include a processor 1502, such as a central processing unit (CPU), a graphics processing unit (GPU), or both. Moreover, the computer system 1500 can include a main memory 1504 and a static memory 1506 that can communicate with each other via a bus 1508. As shown, the computer system 1500 may further include a video display unit 1510 such as a liquid crystal display (LCD), an organic light emitting diode (OLED), a flat panel display, a solid-state display, or a cathode ray tube (CRT). Additionally, the computer system 1500 may include an input device 1512 such as a keyboard, and a cursor control device 1514 such as a mouse. Alternatively, input device 1512 and cursor control device 1514 can be combined in a touchpad or touch sensitive screen. The computer system 1500 can also include a disk drive unit 1516, a signal generation device 1518 such as a speaker or remote control, and a network interface device 1520 to communicate with a network 1526. In a particular embodiment, the disk drive unit 1516 may include a computer-readable medium 1522 in which one or more sets of instructions 1524, such as software, can be embedded. Further, the instructions 1524 may embody one or more of the methods or logic as described herein. In a particular embodiment, the instructions 1524 may reside completely, or at least partially, within the main memory 1504, the static memory 1506, and/or within the processor 1502 during execution by the computer system 1500. The main memory 1504 and the processor 1502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodi-

What is claimed is:

1. A method comprising:
receiving, by a system comprising a processor, a plurality of requests from requesting media processors for a plurality of chunks, each chunk of the plurality of chunks including a portion of video content, each request of the plurality of requests including a deadline for delivery;
identifying, by the system, a first chunk, requested by a first requesting media processor, with a scheduled delivery via a multicast channel that meets a first deadline;
identifying, by the system, a second chunk, requested by a second requesting media processor, not scheduled for delivery or with a scheduled delivery that fails to meet a second deadline;
rescheduling, by the system, delivery of the second chunk, wherein the rescheduling comprises:
identifying a first gap and a second gap in a delivery schedule for the multicast channel, the first gap between the first deadline and a scheduled start of delivery of the first chunk, the second gap between a scheduled end of delivery of the first chunk and a scheduled start of delivery of a succeeding chunk, wherein a sum of the first gap and the second gap exceeds a time required for delivery of the second chunk;
rescheduling delivery of the first chunk to accommodate delivery of the second chunk;
delivering, by the system, the second chunk via the channel based on the rescheduling; and
providing, by the system, information to the second requesting media processor regarding joining a multicast group to receive the second chunk,
wherein the plurality of chunks are delivered via the multicast channel responsive to determining that a number of the requests exceeds a predetermined threshold.

2. The method of claim 1, wherein the rescheduled delivery of the first chunk still meets the first deadline while the rescheduled delivery of the second chunk meets the second deadline.

3. The method of claim 1, wherein the delivery of the first chunk is scheduled for just-in-time delivery to aggregate multiple requests for the first chunk.

4. The method of claim 1, further comprising delivering the first chunk or the second chunk to a random set of non-requesting media processors.

5. The method of claim 1, wherein a request of the plurality of requests includes a globally unique identifier for identifying a chunk.

6. The method of claim 1, wherein the rescheduling delivery of the second chunk is based on a size of the second chunk, a transmission rate, the second deadline, or a combination thereof.

7. A content server comprising:
a memory to store a plurality of chunks and instructions; and
a processor coupled to the memory, wherein responsive to executing the instructions, the processor performs operations comprising:
receiving requests for a first chunk and a second chunk of the plurality of chunks, the request for the first chunk including a first deadline for delivery and the request for the second chunk including a second deadline for delivery, the first chunk having a scheduled delivery via a multicast channel that meets the first deadline, the second chunk not having a scheduled delivery that meets the second deadline;
rescheduling delivery of the second chunk to meet the second deadline, wherein the rescheduling comprises:
identifying a first gap and a second gap in a delivery schedule for the multicast channel, the first gap between the first deadline and a scheduled start of delivery of the first chunk, the second gap between a scheduled end of delivery of the first chunk and a scheduled start of delivery of a succeeding chunk, wherein a sum of the first gap and the second gap exceeds a time required for delivery of the second chunk;
rescheduling delivery of the first chunk to accommodate delivery of the second chunk while still meeting the first deadline;
delivering the second chunk via the multicast channel based on the rescheduled delivery of the second chunk, wherein the delivering is performed via the multicast channel responsive to a number of requests for the second chunk exceeding a predetermined number; and
providing information to a media processor regarding joining a multicast group to receive the second chunk.

8. The content server of claim 7, wherein delivering is performed via the multicast channel when a number of concurrent requests exceeds the predetermined number.

9. The content server of claim 8, wherein the operations further comprise identifying the multicast for the multicast stream upon receiving the request for the second chunk.

10. The content server of claim 7, wherein the chunk represents a portion of a video content that is distributed to a first viewer of a first video program and a second viewer of a second video program different from the first video program.

11. The content server of claim 10, wherein the portion of a video content is an advertisement targeted to a subset of viewers comprising the first viewer and the second viewer.

12. The content server of claim 7, wherein the each of the requests includes a globally unique identifier for identifying a chunk.

13. The content server of claim 7, wherein the rescheduling delivery of the second chunk is based on a size of the second chunk, a transmission rate, the second deadline, or a combination thereof.

* * * * *

UNITED STATES PATENT AND TRADEMARK OFFICE
CERTIFICATE OF CORRECTION

| | |
|---|---|
| PATENT NO. | : 9,462,339 B2 |
| APPLICATION NO. | : 14/270080 |
| DATED | : October 4, 2016 |
| INVENTOR(S) | : Kadangode Ramakrishnan et al. |

It is certified that error appears in the above-identified patent and that said Letters Patent is hereby corrected as shown below:

In the Claims

In Column 20, Lines 48-49, in Claim 9, please delete "identifying the multicast for the multicast stream" and insert -- identifying the multicast channel -- therefor.

Signed and Sealed this
Tenth Day of January, 2017

Michelle K. Lee
*Director of the United States Patent and Trademark Office*